(12) United States Patent
Hesse et al.

(10) Patent No.: US 12,449,521 B2
(45) Date of Patent: Oct. 21, 2025

(54) FORWARD FACING SONAR AND MOUNT

(71) Applicant: Nyren, LLC, St. Cloud, MN (US)

(72) Inventors: Michael Hesse, St. Cloud, MN (US); Daniel Anthony Nyren, St. Cloud, MN (US); Steven Hiemenz, St. Cloud, MN (US)

(73) Assignee: Nyren, LLC, St. Cloud, MN (US)

( * ) Notice: Subject to any disclaimer, the term of this patent is extended or adjusted under 35 U.S.C. 154(b) by 326 days.

(21) Appl. No.: 18/205,972

(22) Filed: Jun. 5, 2023

(65) Prior Publication Data
US 2023/0393251 A1     Dec. 7, 2023

Related U.S. Application Data

(60) Provisional application No. 63/390,262, filed on Jul. 18, 2022, provisional application No. 63/348,821, filed on Jun. 3, 2022.

(51) Int. Cl.
*G01S 7/521*     (2006.01)
*G01S 15/96*     (2006.01)

(52) U.S. Cl.
CPC ............... *G01S 7/521* (2013.01); *G01S 15/96* (2013.01)

(58) Field of Classification Search
CPC ................................. G01S 7/521; G01S 15/96
USPC ............................................................. 367/4
See application file for complete search history.

(56) References Cited

U.S. PATENT DOCUMENTS

| | | | |
|---|---|---|---|
| 4,928,915 A | 5/1990 | Havins | |
| 4,982,924 A | 1/1991 | Havins | |
| 5,202,835 A | 4/1993 | Knight | |
| 6,667,934 B1 * | 12/2003 | Healey | G01S 7/003 367/4 |
| 7,092,316 B2 | 8/2006 | Roth, II | |
| 7,294,029 B1 | 11/2007 | Spaulding | |
| 7,972,188 B2 | 7/2011 | Bernloehr et al. | |
| 9,322,915 B2 | 4/2016 | Betts et al. | |
| 9,335,412 B2 | 5/2016 | Proctor | |
| 9,475,560 B1 | 10/2016 | Jaszewski et al. | |
| 9,676,462 B2 | 6/2017 | Bernloehr et al. | |

(Continued)

*Primary Examiner* — Todd M Epps
(74) *Attorney, Agent, or Firm* — Christensen, Fonder, Dardi & Herbert PLLC; Andrew H. Auderieth; Douglas J. Christensen

(57) ABSTRACT

A mounting system for a front view sonar transducer. The mounting system has a mounting assembly a mounting bracket affixed to a boat and to a mounting clamp. The mounting clamp has a clamping portion configured to clamp around an outside perimeter of a support tube. The mounting system further includes a waterproof motor housing positioned above the mounting bracket, the motor housing secured to a flange on the support tube. A tubular shaft extends through the waterproof motor housing and support tube, the tubular shaft having an upper portion extending upwardly from the waterproof motor housing and a lower portion configured to receive a front view sonar transducer. The tubular shaft directionally controlled by a motor in the motor housing. A trolling motor shaft extending through the tubular shaft with a motor for directionally controlling the trolling motor in the motor housing. The mounting system further includes one or more foot pedal assemblies configured to operate one or both of the electric motors within the waterproof motor housing.

20 Claims, 12 Drawing Sheets

(56) References Cited

U.S. PATENT DOCUMENTS

| | | | |
|---|---|---|---|
| 10,012,731 B2* | 7/2018 | Pelin | G01S 15/96 |
| 10,035,575 B2 | 7/2018 | Bernloehr et al. | |
| 10,549,833 B2 | 2/2020 | Davis et al. | |
| 10,647,400 B2 | 5/2020 | Davis et al. | |
| 11,130,553 B2 | 9/2021 | Salisbury et al. | |
| 11,167,826 B2 | 11/2021 | Clark et al. | |
| 11,217,216 B2 | 1/2022 | Vance | |
| 11,370,516 B2 | 6/2022 | Ridl | |
| 11,971,478 B2* | 4/2024 | Combs | G01S 7/56 |
| 12,099,119 B2* | 9/2024 | Freeman | G01S 15/89 |
| 12,287,416 B2* | 4/2025 | Clark | H04N 1/00411 |
| 2020/0256967 A1 | 8/2020 | Wigh et al. | |
| 2020/0333786 A1 | 10/2020 | Miller et al. | |
| 2021/0165068 A1 | 6/2021 | Clark | |
| 2023/0393251 A1 | 12/2023 | Hesse et al. | |
| 2024/0361439 A1* | 10/2024 | Caspall | G01S 7/524 |
| 2024/0405652 A1* | 12/2024 | Vance | H02K 7/116 |

\* cited by examiner

FIG. 1A
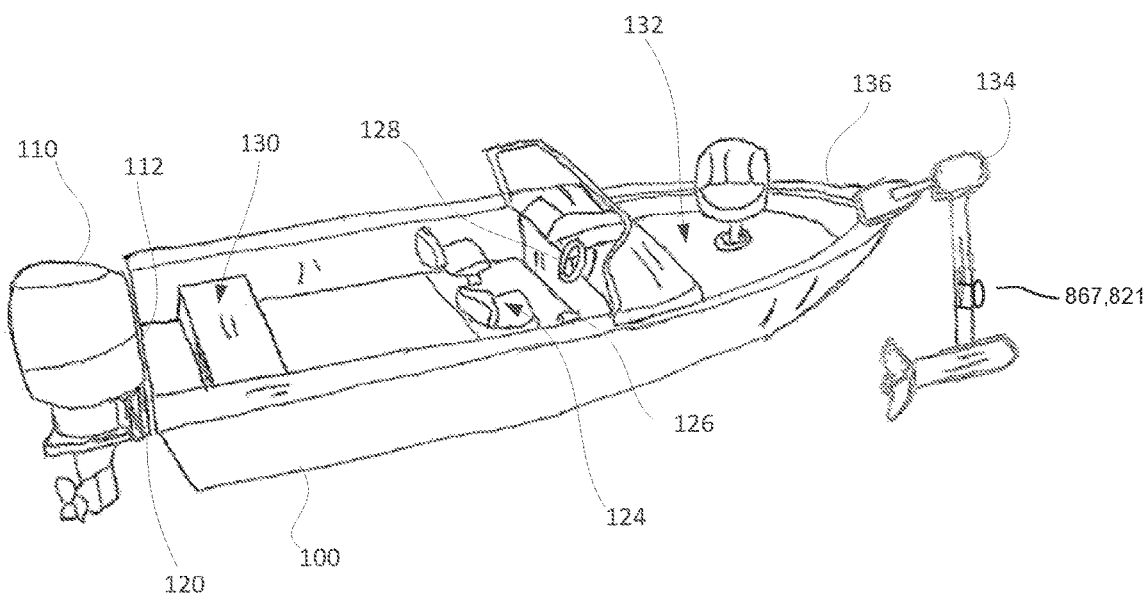
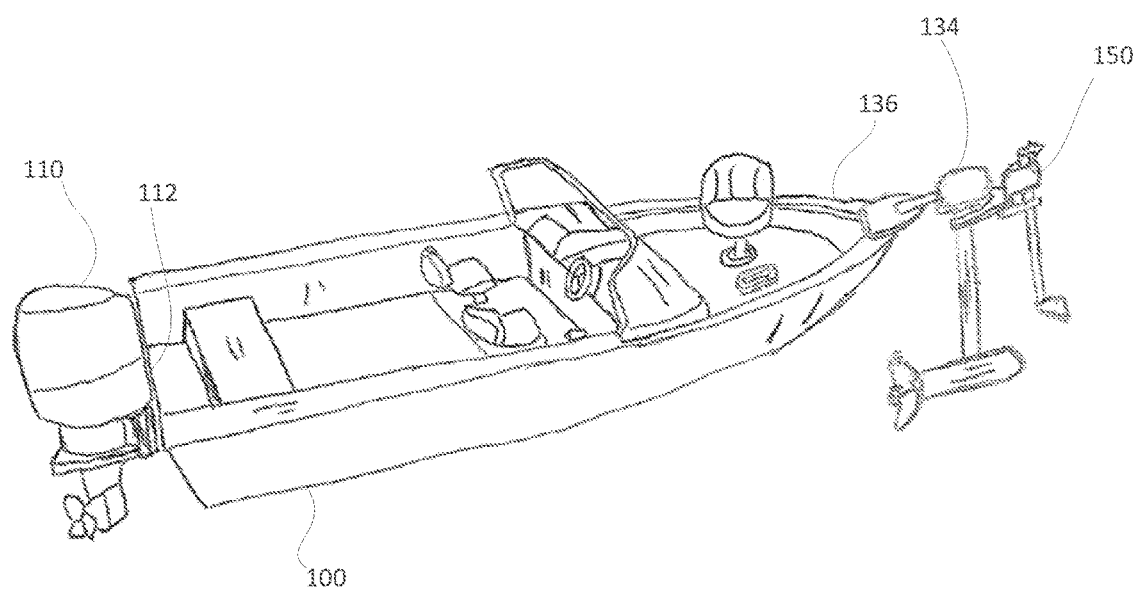
FIG. 1B

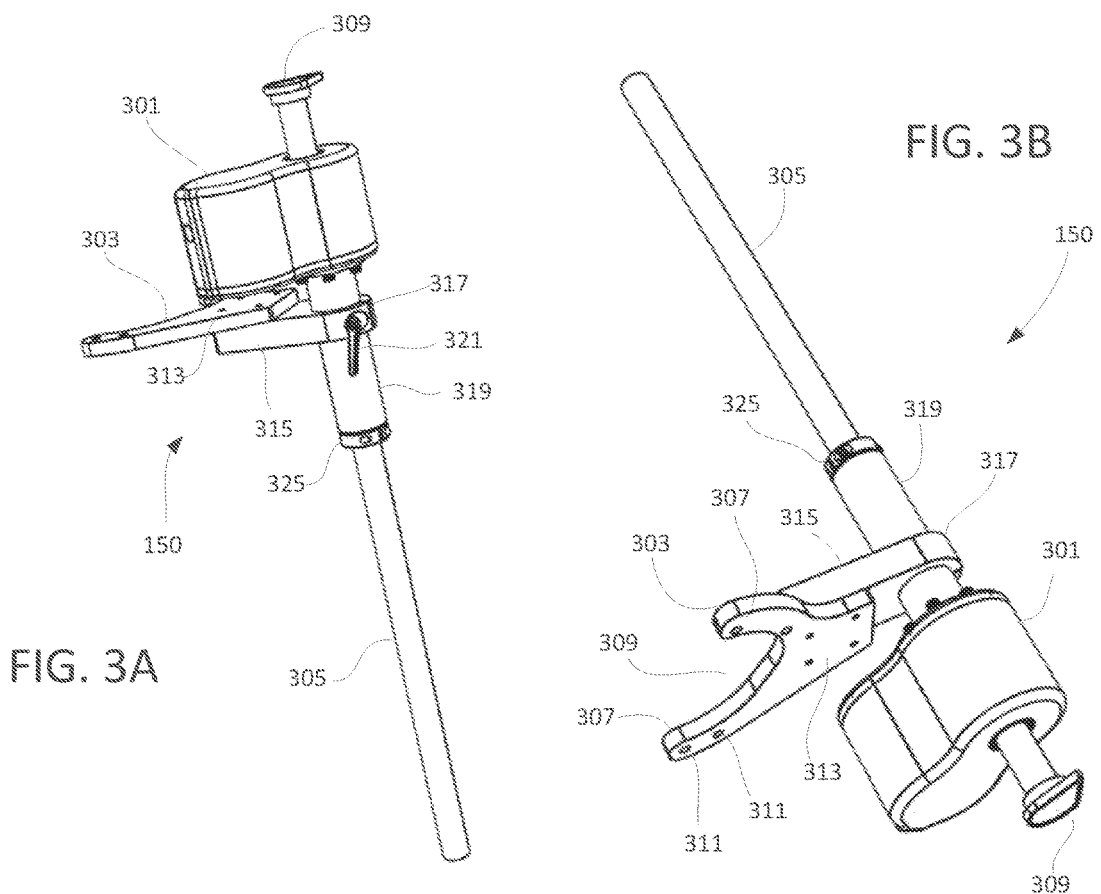
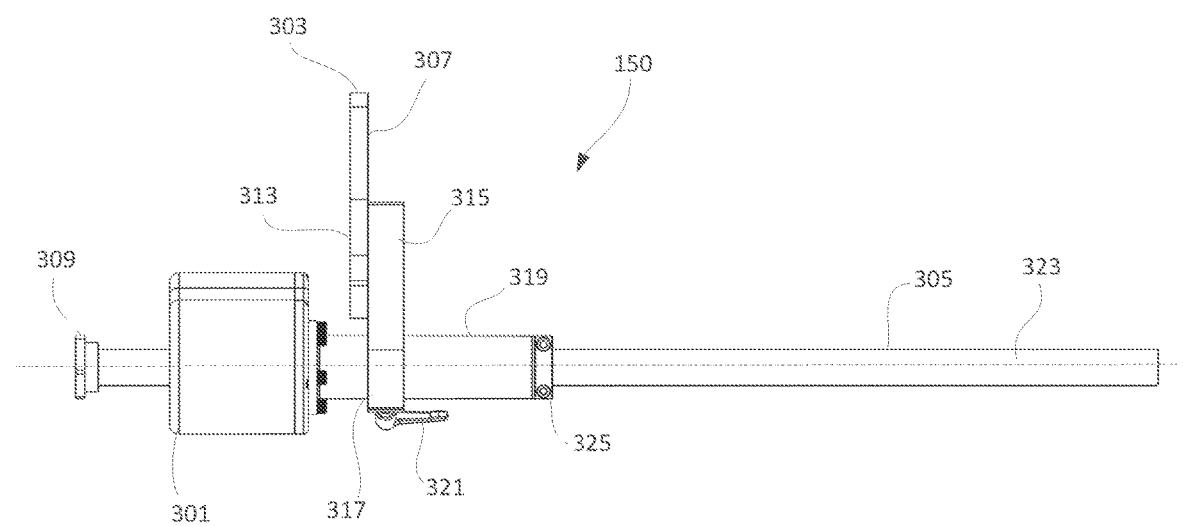
FIG. 4

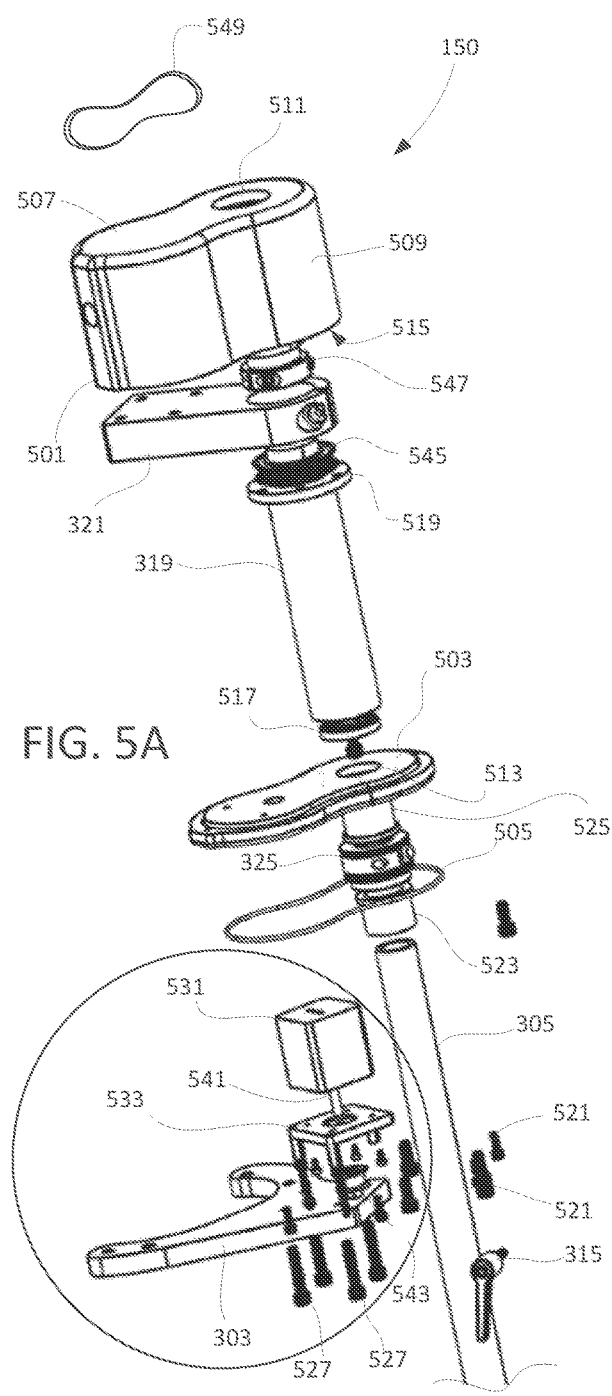
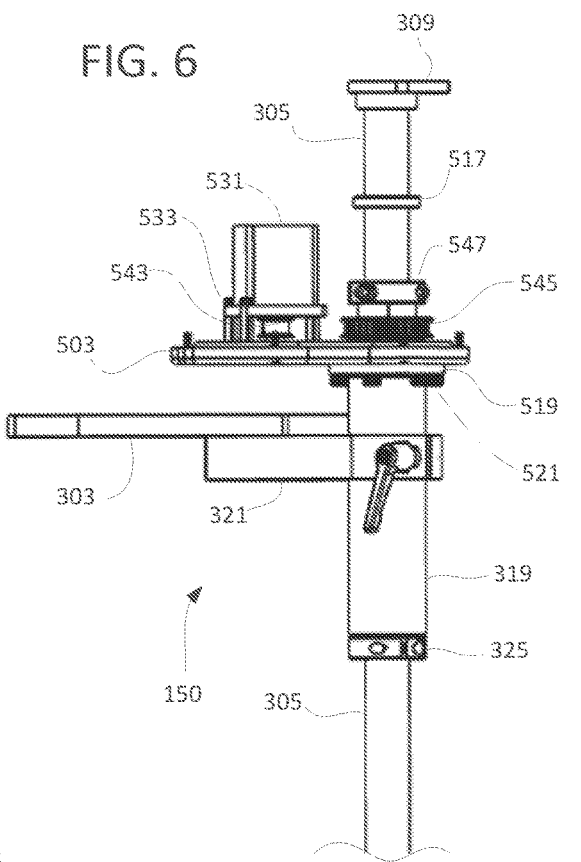
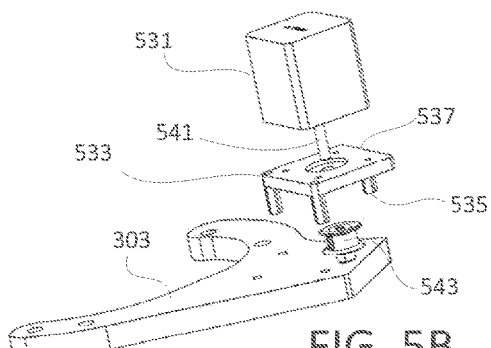
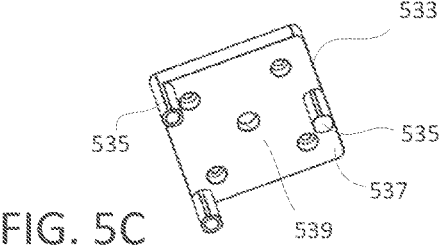

FORWARD FACING SONAR AND MOUNT

CROSS-REFERENCE TO RELATED APPLICATIONS

The present application claims the benefit of U.S. Provisional Patent Application No. 63/348,821, filed Jun. 3, 2022, and of U.S. Provisional Patent Application No. 63/390,262 filed Jul. 18, 2022, all of which are hereby incorporated by reference herein in their entireties.

FIELD OF THE DISCLOSURE

The present invention relates to mechanisms for mounting fish locators onto boats and controlling said mechanisms. More specifically, the present invention relates to a motorized shaft with control features for adjusting the orientation of a front view sonar transducer.

BACKGROUND OF THE DISCLOSURE

Sonar instruments are employed by boaters to locate fish and other objects, such as obstacles, in the water. Sonar instruments include a sonar transducer which emits soundwaves, typically in a conical beam, in the direction of the transducer. The soundwaves bounce of objects, for example, fish, and return to the transducer. The results can then be measured, and an image shown on a display, providing a boater an image of the fish, terrain, and other submerged objects in vicinity of the watercraft.

Sonar transducers are sometimes mounted directly to a boat, such as on a transom, providing an extremely limited view. Transducer mounts are known that require manual operation to alter the direction of the sonar transducer; see, for example, U.S. Pat. No. 4,982,924, the contents of which are incorporated herein for all purposes. Such mounts provide increased to control over the viewing area to boat operators. However, manual operation is not conducive to an operator controlling multiple systems, such as trolling motors, fishing poles, and the like, potentially located in disparate areas of a vessel. Various attempts have been made to overcome these limitations. For example, systems have been described for continuously sweeping a 360-field of view. Other systems have been proposed to fixedly mount or integrate a sonar transducer to a trolling motor, which limits the transducer to only providing data for the exact direction the trolling motor faces. Such systems are disclosed, for example, in U.S. Pat. Nos. 9,322,915; 7,092,316; and U.S. Patent Publication 20210165068, the contents of which are each incorporated herein for all purposes.

The boating industry continues to seek further improvements in operation performance of boats and the associated equipment. Competitive fishing with increased television coverage and sizeable prize money purses has brought many new competitors to the sport along with significant expenditures on equipment for providing a competitive edge. Boating consumers are continuously looking for new technology to enhance their boating and/or fishing experiences. Any advancement in the precision operation of equipment to locate fish and other underwater objects in the vicinity of a boat would be well received by consumers.

SUMMARY

A mounting system for a front view sonar transducer includes a mounting assembly, a waterproof motor housing, a tubular shaft, and a foot pedal assembly. The mounting assembly includes a mounting bracket having a first end secured to a boat and a bottom surface affixed to a mounting clamp. The mounting assembly includes a clamping portion configured to clamp around the outside perimeter of a support tube. The support tube has an upper portion with a flange. The waterproof motor housing is positioned above the mounting bracket and is secured to the support tube flange. The tubular shaft extends through the waterproof motor housing and support tube, the support tube having an upper portion extending upwardly from the waterproof motor housing and a lower portion configured to receive a front view sonar transducer. The foot pedal assembly is configured to operate an electric motor positioned within the waterproof motor housing. The electric motor is configured to impart a two direction rotational motion to the tubular shaft.

In embodiments, the mounting system is integrated as part of a trolling motor system. In embodiments, the bracket supporting the tubular shaft, motor assembly and housing is secured to the mounting bracket of the trolling motor. In embodiments, a tubular shaft to which the front view sonar transducer is attached supports the trolling motor shaft. Motors for the rotation of the tubular shaft supporting the sonar transducer and for rotation of the trolling motor shaft, may be included in a common housing. In embodiments, the trolling motor shaft supports a sonar transducer that may rotate about the trolling motor shaft as controlled by the user. In embodiments, a non-rotating tube may be fixed to the trolling motor mounting system such that the trolling motor shaft is rotatable therein and the front view sonar transducer rotates about the non-rotating shaft, such as on a planetary gear combination. A feature and advantage of embodiments is that the axis of rotation of the front viewing sonar transducer is coincident with the axis of rotation of the trolling motor shaft. A further feature and advantage is that only one tubing assembly with concentric tubes is put in and taken out of the water, as compared to a bracket system with discrete shaft systems extending therefrom.

In embodiments, the electric motor includes a downwardly extending drive shaft, and the drive shaft has a central axis offset and substantially parallel with the tubular shaft. In embodiments, the waterproof motor housing includes a baseplate and the electric motor is mounted to the baseplate. In embodiments, the waterproof motor housing includes a cover and a polymer ring creates a seal between the baseplate and the cover. In embodiments, a polymer seal creates a seal between the baseplate and the support shaft. In embodiments, a polymer seal creates a seal between the cover and the tubular shaft.

In embodiments, a drive belt translates a two-direction rotational motion from the drive shaft to the tubular shaft. In embodiments, the drive belt is generally perpendicular to a central axis of the tubular shaft. In embodiments, the drive belt is a flat belt. In embodiments, the drive belt is a V-groove belt. In embodiments, the drive belt is a circular belt. In embodiments, a flanged sleeve bearing is sandwiched between the tubular shaft and the support tube. In embodiments, a shaft collar secures a pulley to the tubular shaft. In embodiments, the upper portion of the shaft comprises indicia indicating a direction of a field of view being scanned by the front view sonar transducer.

In embodiments, the foot pedal assembly is in wireless communication with the electric motor. In embodiments, the foot pedal assembly includes a base defining a cavity and a controller disposed therein, and a foot pedal covering the cavity. The foot pedal is hingedly connected to the base such that the foot pedal rocks about a fulcrum axis. In embodiments, when the foot pedal is rotated in a first direction, a first end of the foot pedal contacts a first side of the controller, the controller being configured to detect contact at the first side and impart a first rotational direction to the electric motor, and when the foot pedal is rotated in a second direction, a second end of the foot pedal contacts a second side of the controller, the controller being configured to detect contact at a second side and impart a second rotational direction to the electric motor. The first rotational direction is opposite of the second rotational direction. In embodiments, the contact is a physical switch. In embodiments, the contact is a magnetic switch or an inductive sensor. In embodiments, the controller is configured to detect a transition from actuation with the foot pedal to no actuation, and wherein the controller is configured to stop rotation of the electric motor when the controller detects the transition from actuation to no actuation.

A feature and advantage of embodiments is that the foot pedal assembly permits hands free operation of the sonar mount. Often in boating situations an operator is engaging multiple systems and also managing fishing gear, which must be done manually. A feature and advantage of embodiments is magnetic switches allow the unit to IP65 rated. A further feature and advantage of embodiments is magnetic switches offers decreased physical wear and tear on the system permitting greater longevity of the device.

In embodiments, foot pedal assembly comprises a battery. In embodiments, the electric motor assembly comprises a battery. In embodiments, the electric motor is electrically connected to a power source. In embodiments, the electric motor is electrically connected to the foot pedal assembly. In embodiments, there is no physical connection between the foot pedal and the mounting assembly and motor.

In embodiments, the mounting system further includes a digital inertial navigation chip configured to provide a heading. In embodiments, the electric motor includes a fixed mode such that the tubular shaft maintains a fixed orientation determined by the heading. In embodiments, the electric motor includes a scan mode such that the tubular shaft continuously rotates in a first direction and then an opposite second direction, between a first position and a second position, the first and second positions being a predetermined angular offset from the heading.

In an embodiment, a mounting system for a front view sonar transducer includes a trolling motor assembly, a secondary rotating shaft, and a front view sonar transducer. The trolling motor assembly includes a rotational motor housing, a rotating motor shaft extending through the rotational motor housing, and a trolling motor affixed to a bottom portion of the rotating motor shaft. The secondary rotating shaft is positioned coaxial to the rotating motor shaft. The front view sonar transducer is mounted to a bottom portion of the secondary rotating shaft.

In embodiments, the secondary rotating shaft rotates independently from the main motor shaft. In embodiments, the secondary rotating shaft rotates in sync with the main motor shaft. In embodiments, a field of view of the front view transducer coincides with a direction of the trolling motor. In embodiments, a first drive assembly powers the rotating motor shaft and a second a drive assembly powers the secondary rotating shaft.

In embodiments, the mounting system further includes a digital inertial navigation chip. The digital inertial navigation chip can provide a heading and the secondary rotating shaft can maintain a fixed orientation relative to the heading. In embodiments, the digital inertial navigation chip provides a heading and the secondary rotating shaft is configured to move continuously between an angular offset clockwise from the heading and the angular offset counterclockwise from the heading. In embodiments, the secondary rotating shaft is controlled by a foot pedal assembly. In embodiments, the secondary rotating shaft is controlled by a hand held device.

A feature and advantage of embodiments is the integrated circuit board into a head unit of the motor mounting system eliminates the need for an external control box. As boaters add additional systems to their boats, additional control boxes consume space and create clutter, making it difficult to navigate a boat deck. Further, additional wiring strewn across a boat can present a dangerous tripping hazard. A feature and advantage of embodiments is being able to select from a variety of preprogramming scanning modes. A further feature and advantage is being able to easily switch scanning modes using a foot pedal assembly.

BRIEF DESCRIPTION OF THE DRAWINGS

Embodiments of the invention will be described with respect to the figures, in which like reference numerals denote like elements, and in which:

FIG. 1A is a perspective view of a boat with a trolling motor according to embodiments.

FIG. 1B is a perspective view of the boat of FIG. 1A with a sonar transducer mounting system affixed to a trolling motor.

FIG. 3A is a perspective side view of a sonar transducer mounting system in accord with embodiments.

FIG. 3B is a perspective view of the sonar transducer mounting system of FIG. 3A.

FIG. 4 is a side view of the sonar transducer mounting system of FIG. 3A.

FIG. 5A is a partial exploded view of a sonar transducer mounting system in accord with embodiments.

FIG. 5B is a detail view of a mounting bracket for a sonar transducer.

FIG. 5C is a perspective view of a motor mount.

FIG. 6 is a partial side view of a sonar transducer mounting system according to embodiments with a motor housing cover removed.

Figure 2:
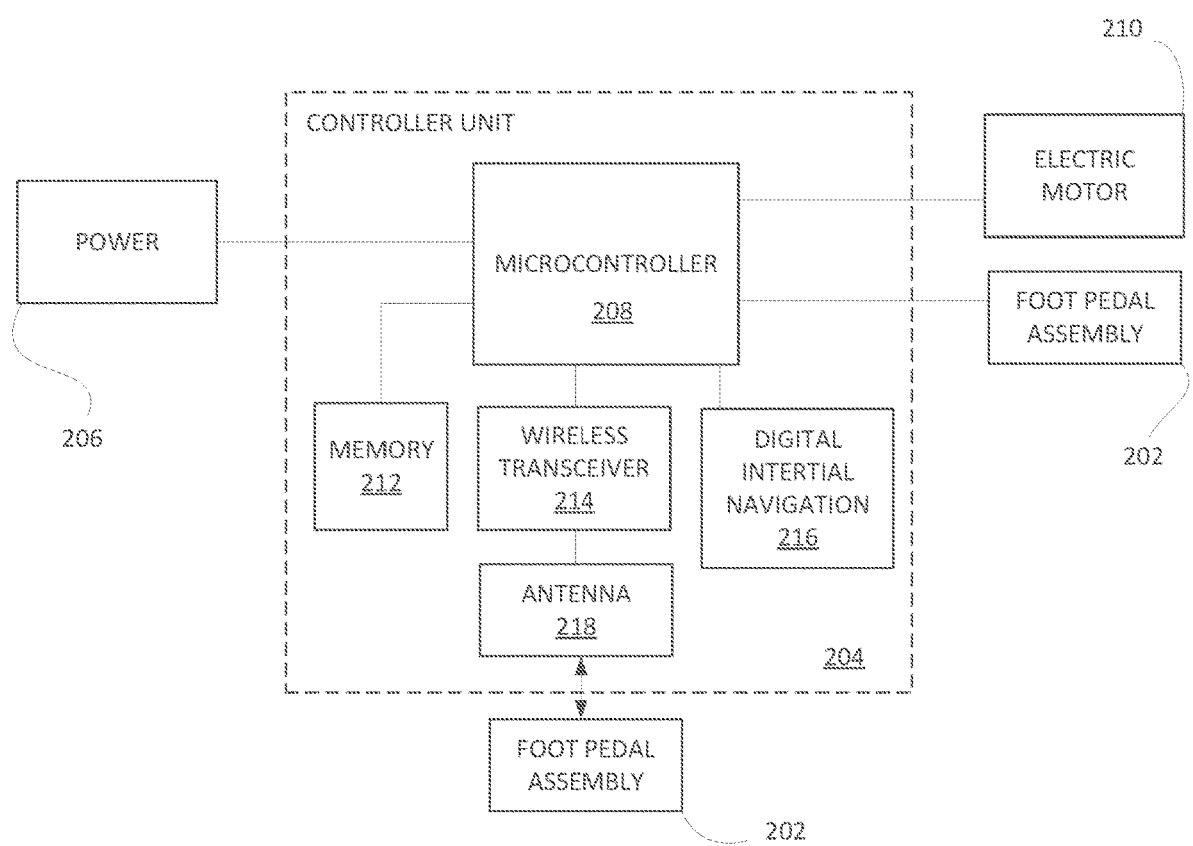
FIG. 2 is a diagrammatic view of a sonar transducer mount control system in accord with embodiments.

While the present invention is amenable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention.

DETAILED DESCRIPTION

Referring to FIGS. 1A-1B, a boat 100 suitable for fishing has an outboard motor 110 mounted to the rear boat transom 112 by way of a jack plate 120. The boat has the driver's seat 124 defining the main boat operator position for driving the boat, and has alternative positions 130, 132 that the boat operator may take when, for example, fishing. The operator will be sitting or standing in such alternative positions, probably standing when in competitive fishing scenarios. Controls 126 for moving jack plate 120, such as raising, lowering, or tilting jack place 120 may be located near driver's seat 124. A trolling motor 134 may be mounted to a front transom 136 of boat 100. In embodiments, trolling motor 134 may be mounted at other positions about boat 100, such as rear transom 112. As shown in FIG. 1B, a sonar mounting system 150 may be affixed to trolling motor 134. In embodiments, sonar mounting system 150 may be directly attached to boat 100. For example, sonar mounting system 150 may be affixed to front transom 136, rear transom 112, or other locations about the boat 100.

Referring to FIGS. 1A-1B and 2, the sonar mounting system 150 is controlled by a control system 200 that includes a foot pedal assembly system 202 which may wirelessly or directly attach to a controller module 204. Foot pedal assembly 202 is described in detail below. Controller unit 204 is connected to power source 206. In embodiments, power source 206 may be a battery such as rechargeable battery. In embodiments, power source 206 may be the boat power supply. In embodiments, controller unit 204 may have an internal power supply connected to microcontroller 208. Microcontroller 208, in turn, is electrically connected to electric motor 210, described in further detail below, for rotating a sonar transducer. In embodiments, controller unit 204 may be incorporated into an electric motor housing. In embodiments, controller unit 204 may be in a separate housing. When the controller unit is housed separately from the electric motor, it may be configured to wirelessly control the motor. In embodiments, electric motor 210 may communicate back to microcontroller 208, for example, by relaying position signals or a motor status. In embodiments, controller unit 204 may be an integrated circuit board. Controller unit 204 includes a memory 212 which may, for example, be used to store motor position and/or status. Controller unit 204 may include a digital inertial navigation chip 216, which may be used to assist in specialized controls of electric motor 210 as described in detail below. Controller unit 204 may further include a wireless transceiver 214 and antenna 218 for wireless communications, such as with a wireless foot pedal assembly 202, or other controllers or systems on the boat.

Referring to FIGS. 3-4, sonar mounting system 150 has a motor housing 301, mounting bracket 303, and tubular shaft 305. Mounting bracket 303 has a pair of arms 307 extending outwardly in a C-shape fashion defining an opening 309 there between. Each of the pair of arms 309 has a plurality of through holes 311 configured to receive fasteners. In embodiments, arms 307, extending outwardly from mounting plate 313, may be directly attached to a boat. In embodiments, arms 307 may extend around other boating accessories for mounting there upon. For example, opening 309 may conform to a trolling motor shaft allowing arms 307 to be fastened to a trolling motor or trolling motor mount. In embodiments, fasters may be screws, bolts, or the like. In embodiments, mounting plate 313 is affixed to mounting clamp 315. Mounting clamp 315 has a clamping portion 317 which may surround support tube 319 and be secured in place by tightening clamp arm 321. In embodiments, motor housing 301 is mounted above mounting bracket 303. In embodiments, motor housing 301 is mounted below mounting bracket 303. Above the bracket means that motor housing is farther from the water than when mounted below the bracket. In embodiments, motor housing 301 is waterproof. In embodiments, motor housing 301 may be submerged below the water.

Tubular shaft 305 extends through motor housing 301 with an upper portion extending upwardly from the housing 301 and a lower portion extending downwardly from the housing 301. Tubular shaft 305 is configured to rotate about central axis 323. In embodiments, tubular shaft 305 is generally perpendicular to motor housing 301 and mounting bracket 303. In embodiments, support tube 319 is fixedly attached to motor housing 301 and is to coaxial tubular shaft 305. Tubular shaft 305 may be further held in place by collar 325, while still being configured to rotate within support tube 319. Upper portion 327 of tubular shaft 305 may include indicia 329. Indicia 329 may indicate a direction of a transducer mounted to tubular shaft 305. Indicia 309 may be, for example, an engraving in shaft 305, a decal affixed to shaft 305, or a molded piece affixed to shaft 305. In embodiments, indicia 309 may be a shape, such as an arrow, a triangle, a tear drop shape, or other shapes which provide a user a visual indication of direction. A device such as a forward facing sonar transducer may be mounted to a bottom portion of shaft 305. Examples of such sonar transducers are available under the trade names Garmin® Panoptix™, Garmin® LiveScope™ Lowrance® ActiveTarget™, and Humminbird® MEGA Live.

FIG. 5A illustrates a partial exploded view of an upper portion of mounting system 150. Motor housing 301 includes a cover 501 and a base plate 503. To provide waterproofing for the interior of motor housing 301, a gasket 505 may provide a seal between cover 501 and base plate 503. Cover 501 has a top surface 507 and a continuous sidewall 509 defining an open interior cavity 515. Top surface 507 defines opening 511 and base plate 503 defines a corresponding opening 513 such that tubular shaft 305 may pass through base plate opening 513, interior cavity 515, and top surface opening 511. Accordingly, the tubular shaft may pass completely through the motor housing, entering a first side, and exiting an opposite side. Shaft seals 517 may provide a waterproof seal between tubular shaft 305 and openings 511, 513 and support tube 319.

Support tube 319 has an upper flange 519 that abuts a bottom surface of base plate 503 and is affixed thereto by, for example, a plurality of screws 521. Support tube may have an upper flanged sleeve bearing 523 and a lower flanged sleeve bearing 525. Flanged sleeve bearings 523, 525 fit partially within support tube 319, and tubular shaft 305, in turn, fits within flanged sleeve bearings 523, 525 such that tubular shaft 305 may rotate freely within the sleeve bearings. Shaft collar 325 may be used to secure lower sleeve bearing 525 in place. As previously discussed, mounting clamp 321 has a mounting portion which may be affixed to support tube 319 by tightening handle 315. Mounting bracket 303 may be affixed to mounting clamp 321 by, for example, a plurality of screws 527.

In embodiments, electric motor 531 is mounted on motor mount 533. FIG. 5B depicts a zoomed in view of the circled portion of FIG. 5A, with the screws removed for added clarity. Referring to FIGS. 5A-5C, motor mount has a plurality of legs 535 extending downwardly from a bottom surface of motor mounting plate 537. Motor mounting plate 537 may have a plurality of apertures corresponding to bores in a bottom surface of motor 531 such that motor 531 may be affixed to mounting plate 537 using screws or the like. Mounting plate 537 further has an aperture 539, which may be generally centrally located, configured to receive motor shaft 541. The portion of motor shaft 541 that extends below mounting plate 537 receives motor pulley 543. Legs 535 may be affixed to base plate 503. In embodiments, legs 535 may have threaded bores or through holes configured to receive screws or the like for securing legs 535 to base plate 503. In embodiments, base plate 503 may have bores or recesses configured to receive a bottom portion of legs 535. In embodiments, some combination of attachment means may be used to affix legs 535 to base plate 503. For example, two legs may be screwed into the base plate while a third leg is placed in a conforming recess. Mounting plate 537 may have two, three, four, or more legs.

Referring to FIG. 6, an upper portion of an assembled mounting system 150 is shown with cover 501 removed. A height of legs 535 defines a gap between motor housing base plate 503 and motor mounting plate 537, the gap accommodating motor pulley 543. Motor pulley 543 has a central axis that is parallel to and offset from a central axis of shaft pulley 545. Shaft pulley 545 is coaxial with tubular shaft 305 and secured to tubular shaft with collar 547. Belt attachment portions of pulleys 543, 545 are generally planar. A belt 549 looped around both pulleys 543, 545 imparts a rotational force to tubular shaft 305 such that shaft 305 is rotated when motor 531 is actuated. Tubular shaft 305 may be rotated freely more than 360 degrees in either the clockwise or counterclockwise direction. In embodiments, belt 547 may be a flat belt, a V-groove belt, or a circular belt. In embodiments, pulleys 543, 545 may be smooth, grooved, have teeth, or other configurations known in the art. As shown, the electric motor sits atop a platform such that the motor shaft extends downwardly from the motor. Alternate positions of the motor, motor shaft, and motor house are not beyond the scope of this disclosure. In embodiments, the motor could be inverted such that the motor is secured to the motor housing base plate with the motor shaft extending upwardly from the motor, and the shaft pulley shifted accordingly along the tubular shaft. In embodiments, the entire motor housing could be inverted such that the housing base plate is positioned above the housing cover. In embodiments, the motor housing and support tube could be shifted downward such that they are positioned below the mounting bracket and/or support clamp. In embodiments, the motor housing could be below the water.

Figure 7A:
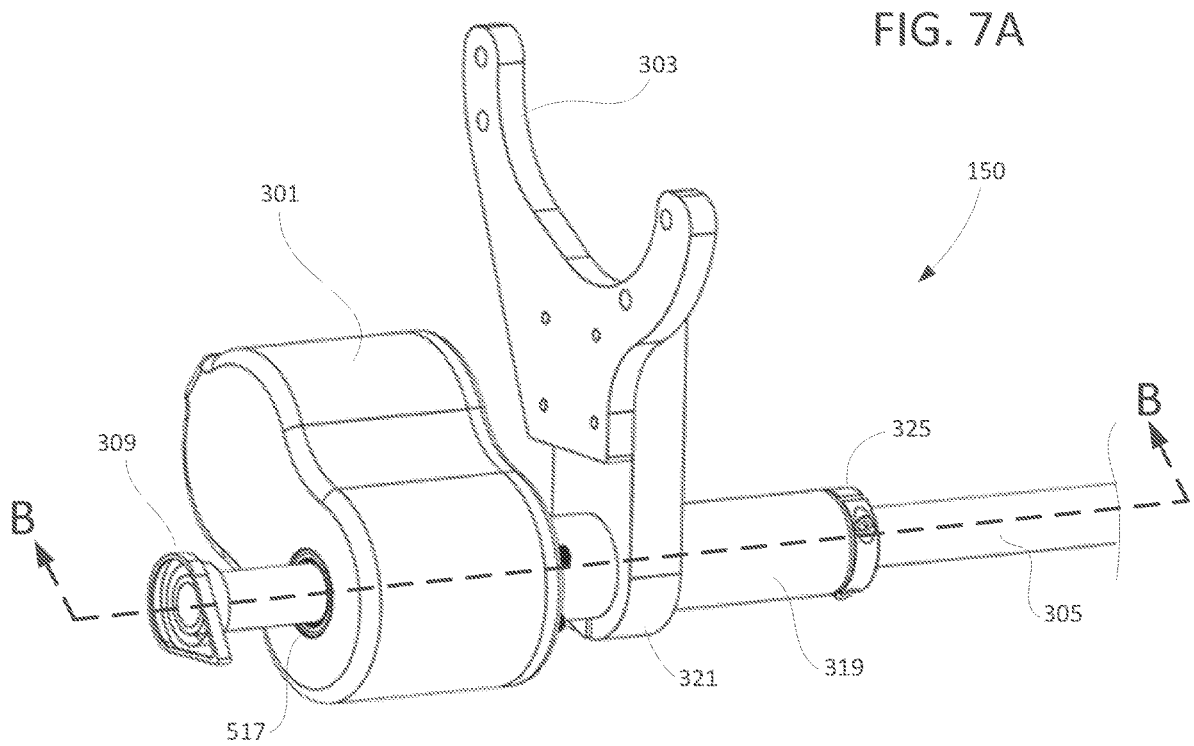
FIG. 7A is a perspective side view of an upper portion of a sonar transducer mounting system in accord with embodiments.
Figure 7B:
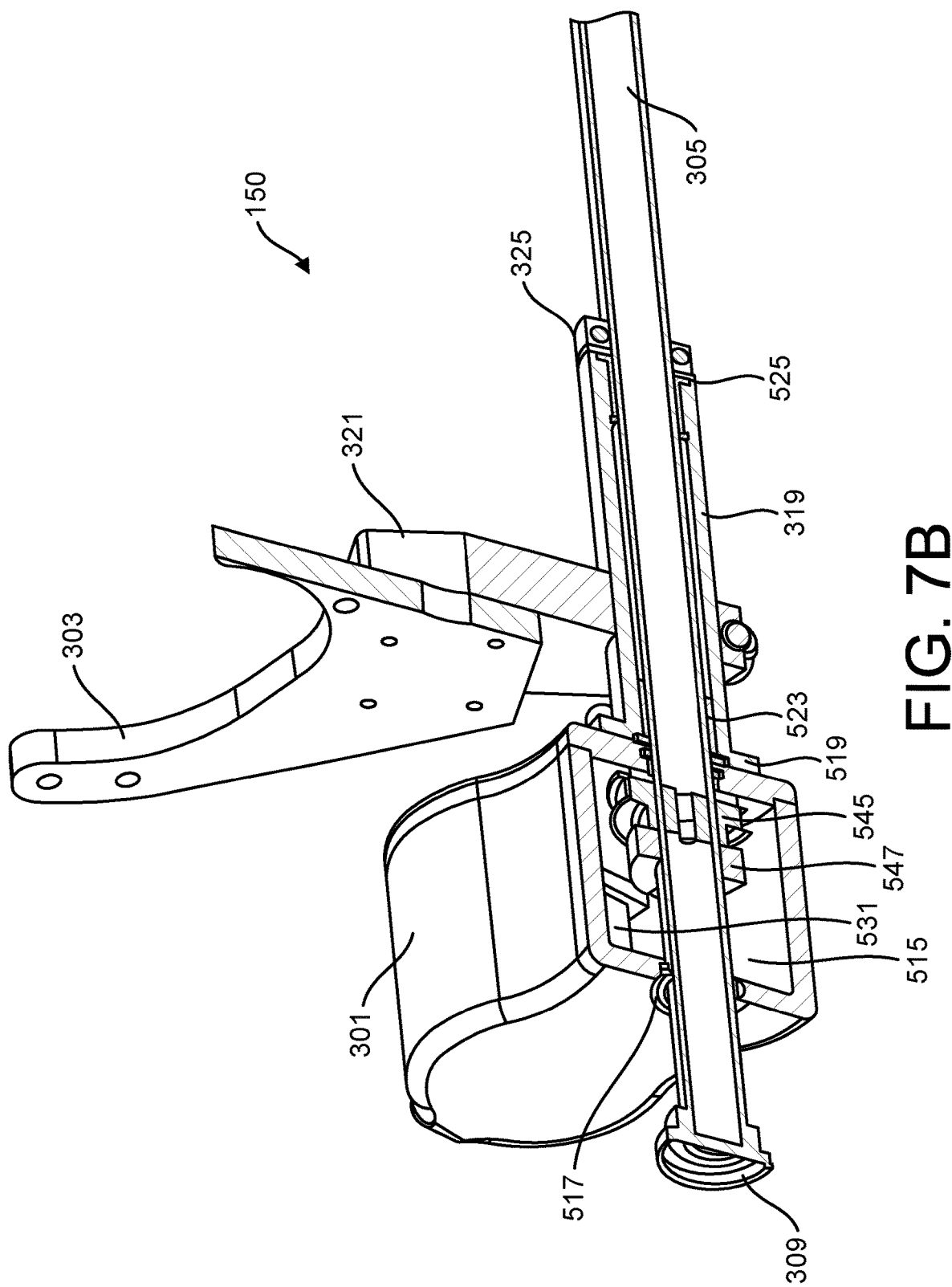
FIG. 7B is a cross-sectional view of the sonar transducer mounting system of FIG. 7A along the B-B line.

FIG. 7A illustrates a perspective side view of an upper portion of a mounting system 150 according to embodiments of the invention. FIG. 7B is a cross-sectional view of the mounting system of FIG. 7A taken along the B-B line. As seen, tubular shaft 305 may be a continuous shaft extending entirely through the motor housing 301 and support tube 319. An upper portion of tubular shaft 305, extending upwardly beyond motor housing 301, has indicia 309. Upper and lower flanged sleeve bearings 523, 525 maintain a slight annular spacing between support tube 319 and tubular shaft 305, allowing tubular shaft to rotate freely in two directions about a common central axis. A lower portion of support tube 319 and lower flanged sleeve bearing 525 may be held in place by collar 325. Upper sleeve bearing 523 may be held in place by affixing a flange 519 of support tube 319 to motor housing 301.

Openings in motor housing 301 may be protected by seals 517 permitting tubular shaft 305 to rotate while preventing seepage of water or moisture into interior cavity 515. A belt drive motor system housed within cavity 515 is configured to rotate tubular shaft at least 360 degrees clockwise or counterclockwise. Shaft pulley 545 surrounds tubular shaft 305 and is held in place by collar 547.

Figure 8A:
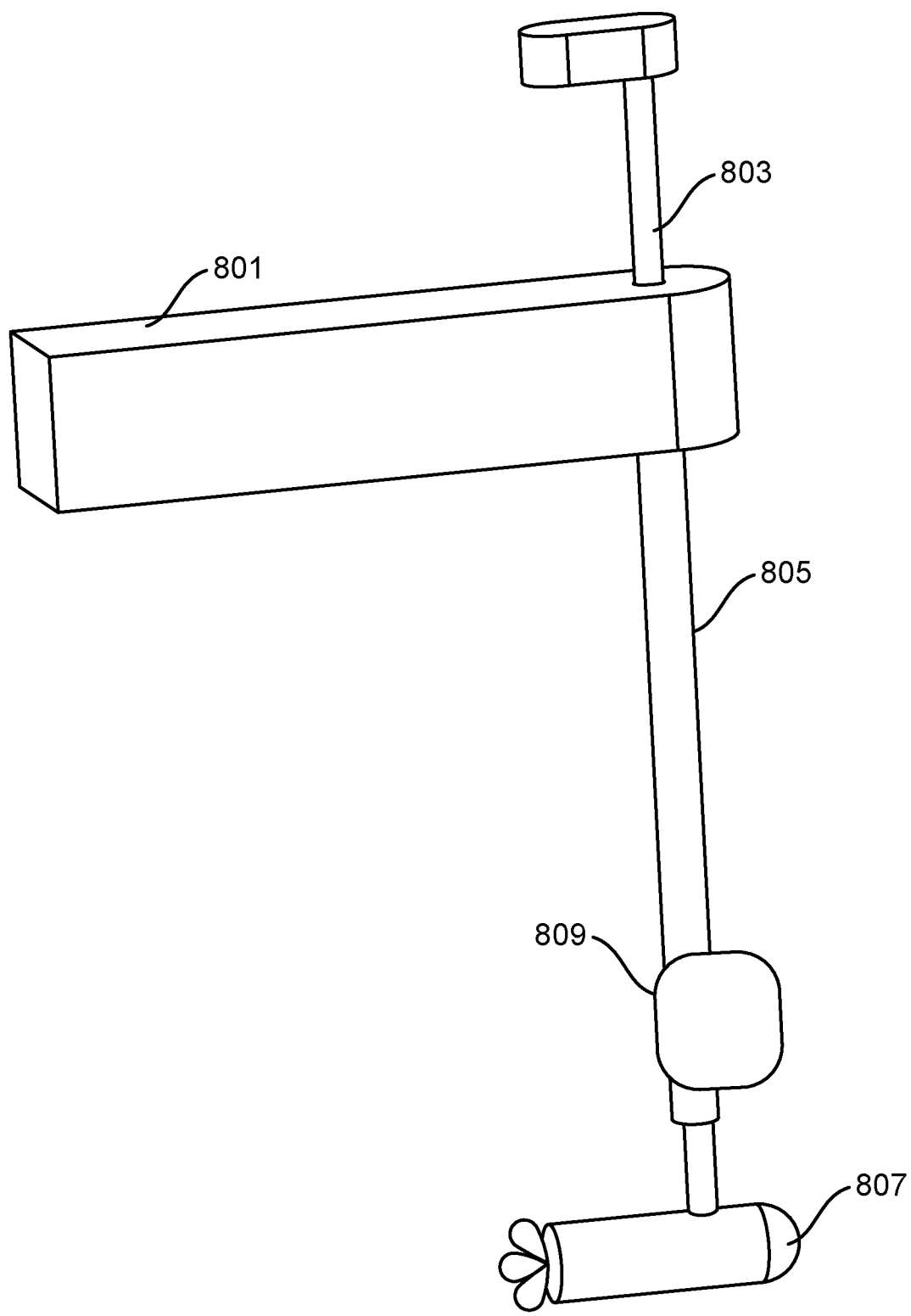
FIG. 8A is a perspective view of a sonar transducer mounting system according to an embodiment.

FIG. 8A illustrates an alternative embodiment of a transducer mounting system in combination with a trolling motor. Motor housing 801 includes a drive system to independently drive the trolling motor shaft 803 and the transducer mounting shaft 805, where the transducer mounting shaft 805 slides over the trolling motor shaft 803. For example, a first motor may rotate trolling motor shaft 803 and a second motor may rotate transducer mounting shaft 805. Accordingly, trolling motor 807, mounted to a bottom portion of trolling motor shaft 803 may rotate independently of a sonar transducer 809 mounted to a bottom portion of transducer mounting shaft 805. The secondary transducer mounting shaft could follow the main trolling motor shaft via the trolling motor main foot pedal, be independent using a secondary control such as a key fob or foot pedal, or use a compass locking feature or a scanning feature.

Figure 8B:
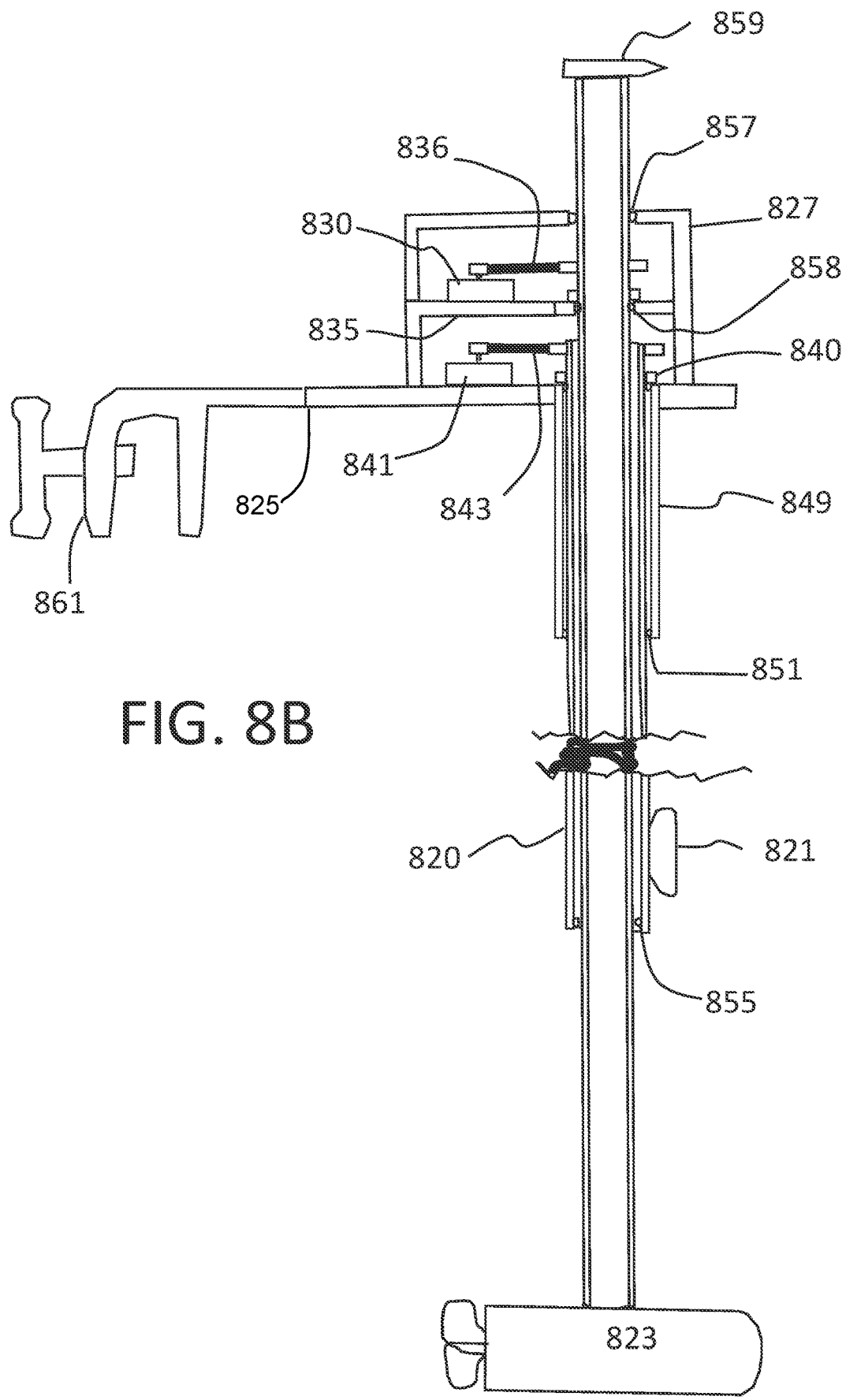
FIG. 8B is a cross sectional view of a sonar transducer mounting system according to an embodiment.

Referring to FIG. 8B, an arrangement for the having the rotatable transducer shaft 820 with transducer 821 and rotatable trolling motor shaft 833 with trolling motor 823 is illustrated in accord with embodiments. A mounting bracket 825 with a chassis and housing 827 that supports the motor 830 that drives the trolling motor shaft 822 on a first shelf 835 of the housing. The trolling motor shaft may connect through a drive system such as a pulley system 836 and may be supported on the first shelf such as by a collar 837 integral with the trolling motor shaft. Other drive systems, including a geared system would be suitable as well. A second shelf 839 supports the sonar transducer shaft 820 such as by a collar 840 attached to or unitary with the sonar transducer shaft 820. A motor 841 drives the sonar transducer shaft 820 by way of a drive system 843 configured as a pulley and belt system. Other drive systems including gear systems would be suitable. A fixed non-rotatable shaft 849 extends downwardly from the housing 827 and with an internal bearing 851 positions and supports the rotatable sonar transducer shaft 820. Bearing 855 positioned in the end of the rotatable sonar transducer shaft 820 may position and rotatably support the trolling motor rotatable shaft 822. Bearings 857, 858 may also rotatable support the trolling motor rotatable shaft 822. A direction indicator 859 may be on the top of the trolling motor rotatable shaft 822. In embodiments, the trolling motor shaft may be manually directable rather than motorized, with a handle positioned at the top of the trolling motor shaft. Clamping system 861 may attach the chassis and housing to the boat.

Figure 8C:
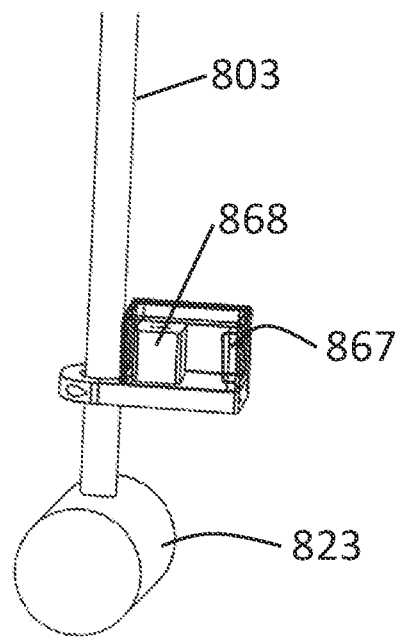
FIG. 8C is a perspective view of a sonar transducer mounting system according to an embodiment.
Figure 8D:
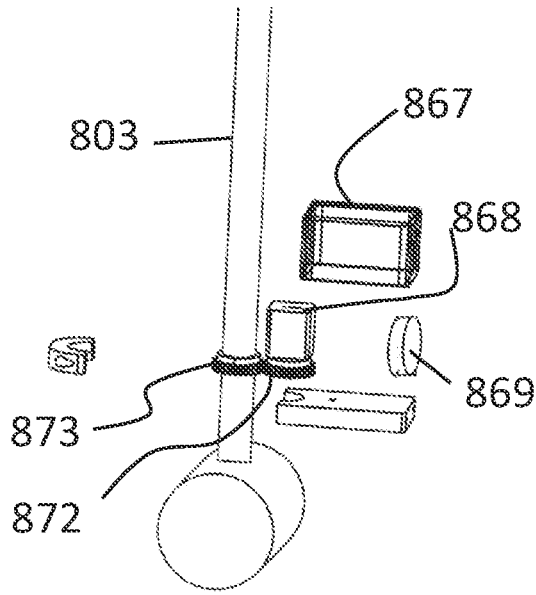
FIG. 8D is a perspective view of a sonar transducer mounting system according to an embodiment.

Referring to FIGS. 8C and 8D, in embodiments, a motor housing, not shown, attached to the trolling motor shaft 803 controls only the trolling motor shaft 803, and a second housing 867 mounted below motor housing 801 contains a motor 868 that rotates the housing, including the sonar transducer 869 about the trolling motor shaft. A planetary gear system 872, with a first gear 873 fixed to the trolling motor shaft 830 causes transducer 869 to rotate about the trolling motor shaft when the motor is actuated such as by the control systems described herein.

Figure 8E:
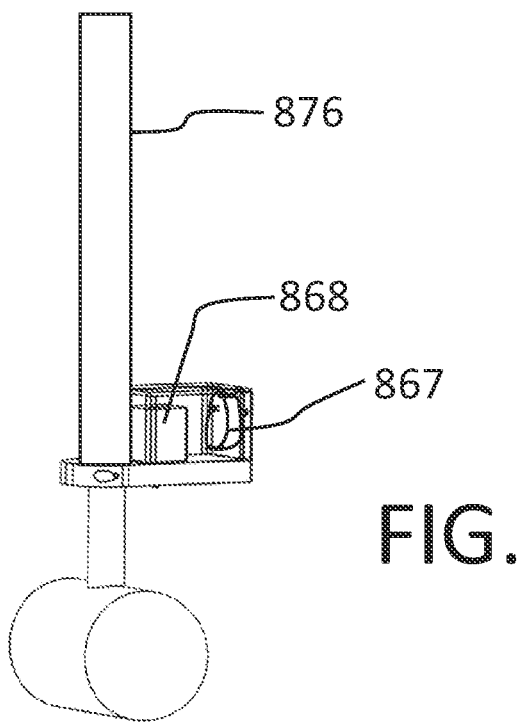
FIG. 8E is a perspective view of a sonar transducer mounting system according to embodiments.

Referring to FIG. 8E, the second housing 867 with the motor 868 may also rotate about a fixed non rotatable tube 876 that is fixed to a housing with the trolling motor and drive system, not shown in this view. A planetary gear system 872 as shown in FIG. 8D may rotate the transducer housing about the fixed shaft 876.

The systems herein may be integrated with trolling motors as described above. Various trolling motors and mounting and control systems are illustrated in the following patents which are incorporated by reference herein for all purposes: U.S. Pat. Nos. 7,294,029; 7,972,188; 9,475,560; 10,549,833; 10,647,400; 11,130,553; and 11,167,826.

Shafts or tubes may be constructed of metals or metal alloys such as aluminum or stainless steel. In embodiments tubes or shafts may be polymers such a PVC or plastic piping. In embodiments, tubes or shafts may be extruded. In embodiments, tubes or shafts may be fiberglass or similar composite materials.

Referring to FIGS. 9A-9H, a foot pedal assembly 900 is illustrated for controlling a motorized sonar mount. Foot pedal assembly 900 includes a foot pedal 901 rotatably attached to a foot pedal housing 903 that teeters or rocks about a central fulcrum. In embodiments, a pair of centrally located screws 905 act as both attachment means and fulcrum for foot pedal 901. In embodiments, screws 905 are thumbscrews. In embodiments, foot pedal housing 903 includes one or more flanges 907, each flange having a through hole 909. Flanges 907 may be used to secure foot pedal assembly 900 to a surface. For example, foot pedal assembly 900 might be screwed to a boat deck. A bottom surface 911 of foot pedal housing 903 may include a removal door 913. Removable door 913 may be snapped into place. In embodiments, removal door 913 may be threaded and screw into place, creating a watertight fit with foot pedal housing 903.

Figure 9A:
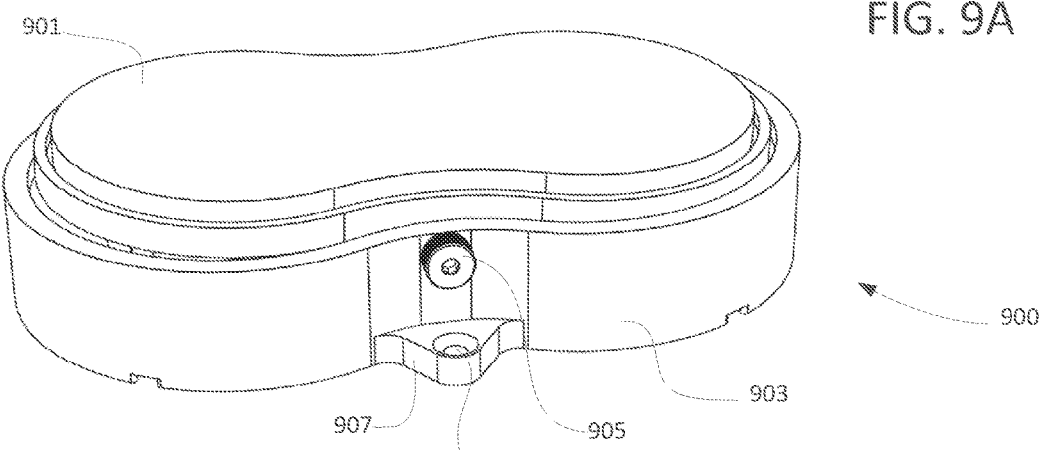
FIG. 9A is a perspective top view of a foot pedal assembly according for controlling a sonar transducer mounting system.
Figure 9B:
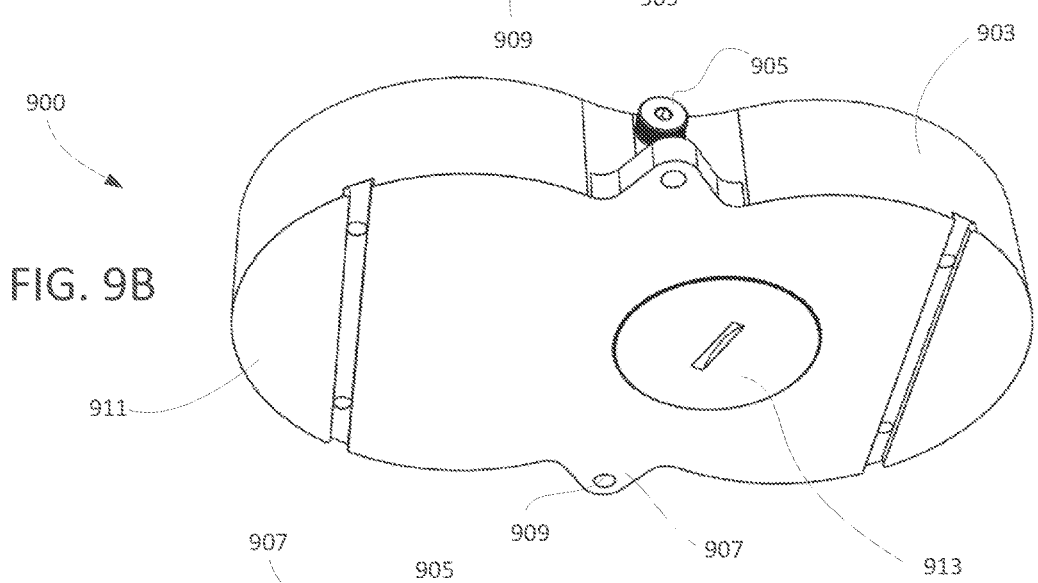
FIG. 9B is a perspective bottom view of the foot pedal assembly of FIG. 9A.
Figure 9C:
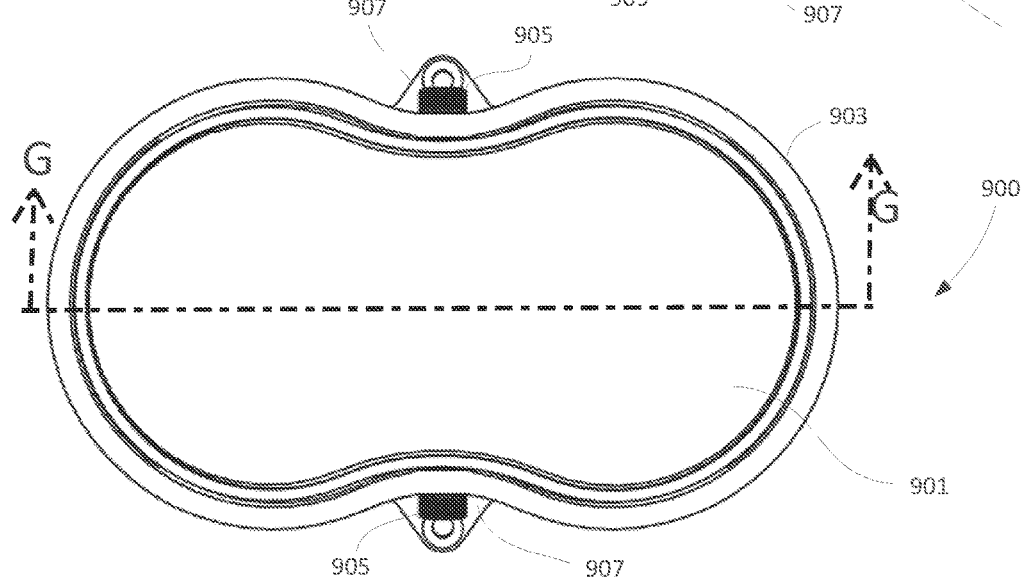
FIG. 9C is a top view of the foot pedal assembly of FIG. 9A.
Figure 9D:
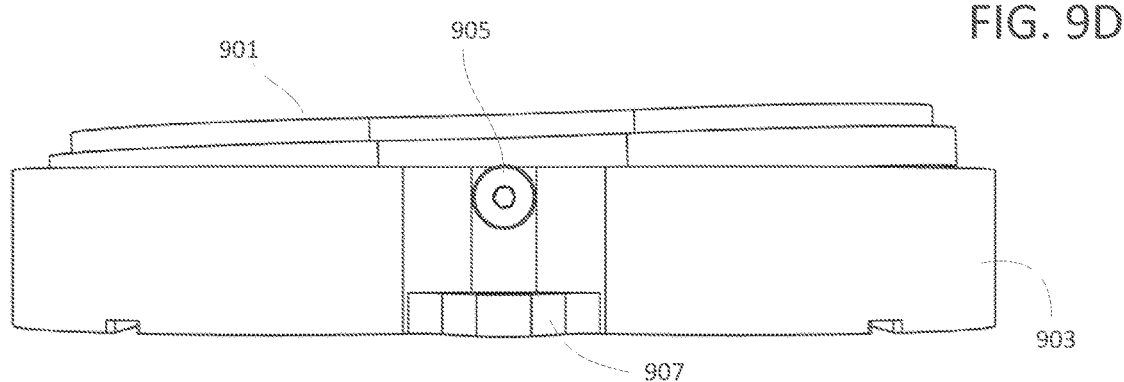
FIG. 9D is a side view of the foot pedal assembly of FIG. 9A.
Figure 9E:
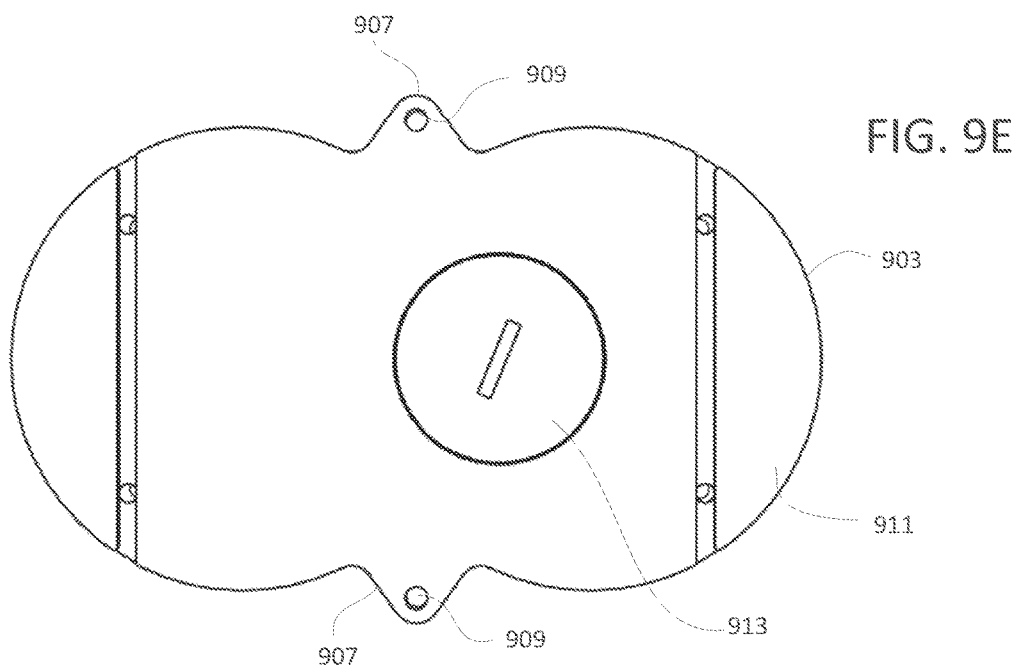
FIG. 9E is a bottom view of the foot pedal assembly of FIG. 9A.
Figure 9F:
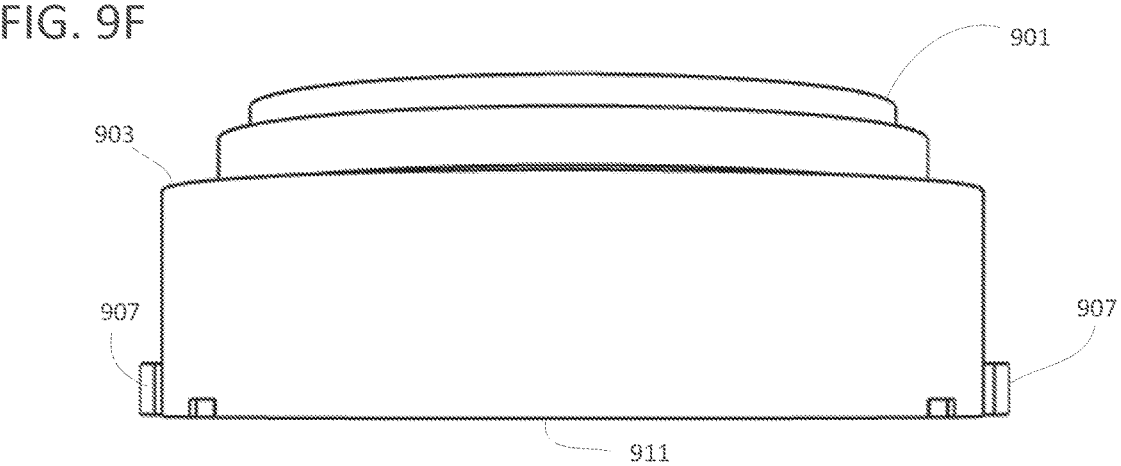
FIG. 9F is a front view of the foot pedal assembly of FIG. 9A.
Figure 9G:
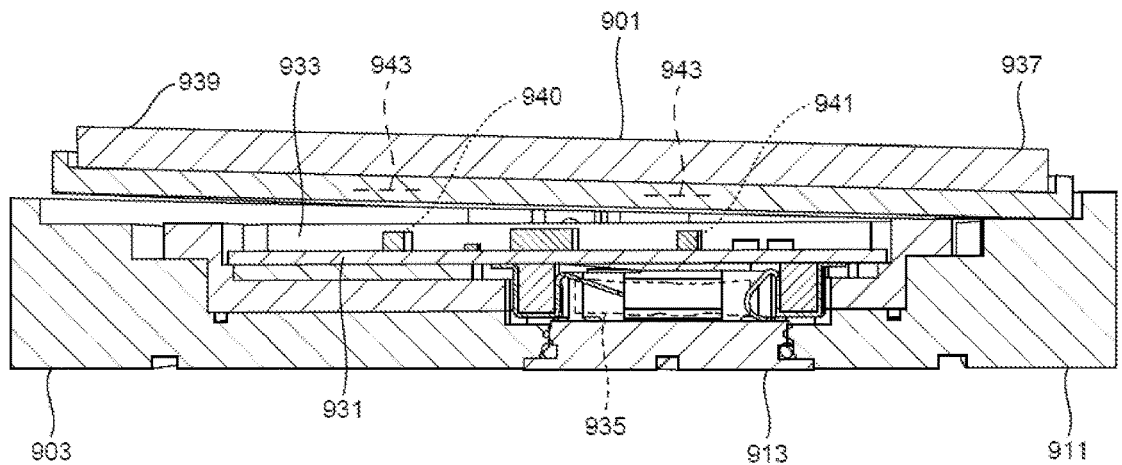
FIG. 9G is a cross sectional view of the foot pedal assembly of FIG. 9C taken along the G-G line.
Figure 9H:
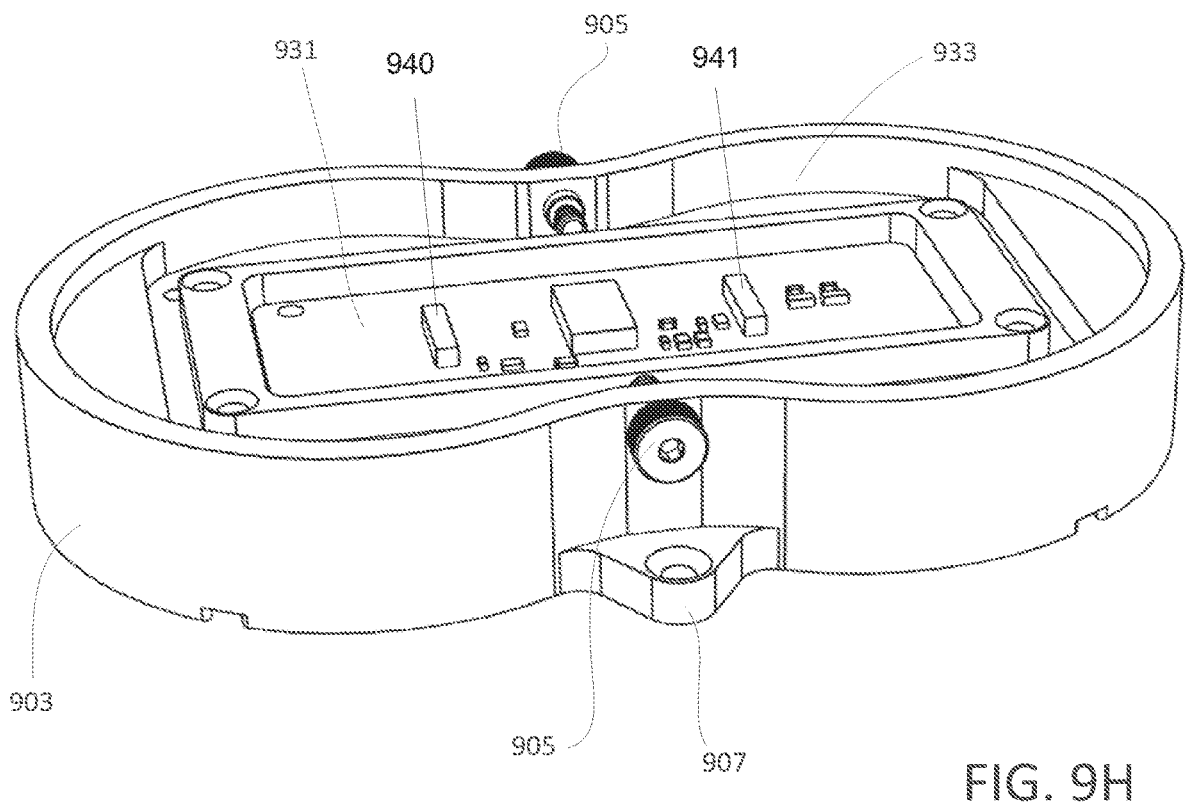
FIG. 9H is a top perspective view of the foot pedal assembly of FIG. 9A with the upper pedal removed.

FIG. 9G is a cross-sectional view taken along the G-G line of FIG. 9C. Circuitry configured as an integrated circuit board 931 fits inside a cavity 933 within housing 903 between bottom surface 911 and foot pedal 901. Integrated circuit board 931 may include a microcontroller or processor, a memory, a wireless transceiver, and an antenna. In embodiments, integrated circuit board 931 may include a power supply, such as a battery 935, shown in dashed lines, positioned in battery slots on the bottom of integrated circuit board 931. The circuit board may be sealed within the foot switch housing by a cover or may be potted in with potting material, not shown. In embodiments, removing or opening removable door 913 provides access to replace batteries 935.

Pressing on a first end 937 of foot pedal 901 causes it to pivot about pivot point 905 and actuate a first switch 941 of integrated circuit board 931. Pressing on a second end 939 of foot pedal actuates a second switch 940. In embodiments, switches are physical contact switches. In embodiments, contact switches are magnetic switches with actuator magnets 943 attached to or mounted in foot pedal. Magnetic switches permit the foot pedal assembly to be IP65 rated. Magnetic switches provide a further advantage of reducing wear and tear on the foot pedal assembly during standard operation. In embodiments, the switches may be inductive switches with actuator 943 being a metal or other suitable material. Upon switch actuation, integrated circuit board 911 may relay operational instructions to the electric motor assembly. For example, a tap, that is, a press and subsequent immediate release, of the first contact switch may cause the electric motor to rotate the sonar transducer in a clockwise direction, whereas a tap on the second contact switch may be programmed to rotate the sonar transducer in a counter-clockwise direction. Different combinations of tapping and holding the foot pedal with a contact switch may be programmed for different results. By way of example, a switch may be programmed to rotate the tubular shaft while the pedal is held down and to stop rotation when the pedal is released. In embodiments, the switch may be configured to continue to rotate the shaft upon a first press of the switch until a second, subsequent press of the switch, at which time the motor is stopped. In embodiments, a hold is when there is continuous contact for at least a predetermined amount of time. In embodiments, a hold may be 2 seconds of continuous contact. In embodiments, a hold may be 3 or more seconds of continuous contact. In embodiments, particular sequences of taps and/or holds may be configured to actuate the electric motor according to predefined programs, as detailed further below. For example, a double tap may cause the motor to enter a scanning mode, a triple tap may cause the unit to enter into a sweeping mode, and a double tap on the first end followed immediately by a double tap on a second end may cause the unit to enter into a compass lock mode. It should be understood that these combinations are examples only, and other combinations of taps and holds may be used to initiate the disclosed modes. Further, some combinations may be pre-programmed, while other combinations may be user definable such that the operator may select their preferred choice of combination to activate particular operational modes.

The electric motor may have different operational modes. In a standard operating mode, the motor rotates the shaft in a predetermined direction while there is a contact with a controlling switch and the motor stops when the switch is released. In a scanning mode, the motor rotates back and forth between a first stop and a second stop, thereby causing the sonar transducer to continuously scan a defined field of view. In embodiments, a field of view may be 30, 45, 60, or degrees. In embodiments, a user may set the first and second stops, thereby creating a user defined field of view. In embodiments, a field of view is less than 360 degrees. In a sweeping mode, the motor rotates continuously in a clockwise or counterclockwise direction without stopping or reversing direction. In a compass lock mode, the motor maintains the sonar transducer pointing at particular heading. A digital inertial navigation chip can provide instant heading information. The motor controller can rotate the shaft as necessary to ensure that the sonar transducer remains at fixed heading regardless of external conditions such turns of the boat. For example, if the boat changes course to shift 15 degrees starboard, the motor controller may rotate the sonar transducer 15 degrees in the port direction to compensate.

The following U.S. patents and U.S. patent publications contain content, aspects, structure, components, and functionalities relating to or applicable to sonar and/or trolling motor mounting systems are incorporated by reference herein in their entireties for all purposes: U.S. Pat. Nos. 4,928,915; 4,928,924; 5,202,835; 9,322,915; 9,335,412; 9,676,462; US2020033786; US20200256967; US20210284310; and US20210165068.

Although the present invention has been described with reference to particular embodiments, those skilled in the art will recognize that changes may be made in form and substance without departing from the spirit and scope of the invention. The embodiments described above are intended to be illustrative and not limiting.

What is claimed is:

1. A mounting system for a front view sonar transducer comprising:
   a mounting assembly comprising
      a mounting bracket having a first end secured to a boat and a bottom surface affixed to a mounting clamp, wherein the mounting clamp comprises a clamping portion configured to clamp around an outside perimeter of a support tube, the support tube having an upper portion with a flange;
      a waterproof motor housing positioned above the mounting bracket, the motor housing secured to the support tube flange;
      a tubular shaft extending through the waterproof motor housing and support tube, the support tube having an upper portion extending upwardly from the waterproof motor housing and a lower portion configured to receive a front view sonar transducer; and
   a foot pedal assembly configured to operate an electric motor within the waterproof motor housing,
   wherein the electric motor is configured to impart selectively either of a two direction rotational motion to the tubular shaft.

2. The mounting system of claim 1, wherein the electric motor comprises a downwardly extending drive shaft, and wherein the drive shaft has a central axis offset and substantially parallel with the tubular shaft.

3. The mounting system of claim 2, wherein the waterproof motor housing comprises a baseplate and the electric motor is mounted to the baseplate.

4. The mounting system of claim 2, wherein a drive belt translates rotation of the drive shaft to the tubular shaft.

5. The mounting system of claim 4, wherein the drive belt is generally perpendicular to a central axis of the tubular shaft.

6. The mounting system of claim 1, wherein a flanged sleeve bearing is sandwiched between the tubular shaft and the support tube.

7. The mounting system of claim 1, wherein a shaft collar secures a pulley to the tubular shaft.

8. The mounting system of claim 1, wherein the upper portion of the shaft comprises indicia indicating a direction of a field of view being scanned by the front view sonar transducer.

9. The mounting system of claim 1, wherein the foot pedal assembly is in wireless communication with the electric motor.

10. The mounting system of claim 9, wherein the foot pedal assembly comprises a base defining a cavity and a controller disposed therein, and a foot pedal covering the cavity, wherein the foot pedal is hingedly connected to the base such that the foot pedal rotates about a central axis.

11. The mounting system of claim 10, wherein when the foot pedal is rotated in a first direction, a first end of the foot pedal contacts a first side of the controller, the controller being configured to detect contact at the first side and impart a first rotational direction to the electric motor, and wherein when the foot pedal is rotated in a second direction, a second end of the foot pedal contacts a second side of the controller, the controller being configured to detect contact at a second side and impart a second rotational direction to the electric motor.

12. The mounting system of claim 11, wherein the first rotational direction is opposite of the second rotational direction.

13. The mounting system of claim 11, wherein the controller is configured to detect a transition from contact with the foot pedal to no contact, and wherein the controller is configured to stop rotation of the electric motor when the controller detects the transition from contact to no contact.

14. The mounting system of claim 1, further comprising a digital inertial navigation chip configured to provide a heading.

15. The mounting system of claim 14, wherein the electric motor comprises a fixed mode wherein the tubular shaft maintains a fixed orientation determined by the heading.

16. The mounting system of claim 14, wherein the electric motor comprises a scan mode wherein the tubular shaft continuously rotates between a first position and a second position, the first and second positions being a predetermined angular offset from the heading.

17. The mounting system of claim 1, wherein the electric motor is connected to the sonar transducer shaft and wherein the housing comprises an additional electric motor connected to the trolling motor shaft.

18. A mounting system for a front view sonar transducer comprising:
   a trolling motor assembly comprising a rotational motor housing, a rotating motor shaft extending through the rotational motor housing, and a trolling motor affixed to a bottom portion of the rotating motor shaft;
   a secondary rotating shaft coaxial to the rotating motor shaft; and
   a front view sonar transducer mounted to a bottom portion of the secondary rotating shaft, wherein a first drive assembly powers the rotating motor shaft and a second a drive assembly powers the secondary rotating shaft, and the secondary rotating shaft is controlled by a foot pedal assembly.

19. The mounting system of claim 18, further comprising a digital inertial navigation chip configured to provide a heading, and wherein the secondary rotating shaft is configured to maintain a fixed orientation relative to the heading or to rotate continuously between an angular offset clockwise from the heading and the angular offset counterclockwise from the heading.

20. A mounting system for a front view sonar transducer comprising:
   a mounting assembly comprising
      a mounting bracket having a first end secured to a boat and a bottom surface affixed to a mounting clamp, wherein the mounting clamp comprises a clamping portion configured to clamp around an outside perimeter of a support tube, the support tube having an upper portion with a flange;
      a waterproof motor housing positioned above the mounting bracket, the motor housing secured to the support tube flange;
      a tubular sonar transducer shaft extending through the waterproof motor housing and support tube, the support tube having an upper portion extending upwardly from the waterproof motor housing and a lower portion configured to receive a front view sonar transducer;

a trolling motor shaft extending through the tubular sonar transducer shaft with a trolling motor mounted at a lower end of the trolling motor shaft, and a foot pedal assembly configured to operate an electric motor within the waterproof motor housing, wherein the electric motor is configured to impart a two direction rotational motion to the tubular sonar transducer shaft.

\* \* \* \* \*